United States Patent [19]

Cates

[11] Patent Number: 4,666,471
[45] Date of Patent: May 19, 1987

[54] MUD DEGASSER

[76] Inventor: Thomas D. Cates, 900 N. 8th Ave., Edinburg, Tex. 78539

[21] Appl. No.: 761,858

[22] Filed: Aug. 2, 1985

[51] Int. Cl.⁴ ............................................. B01D 19/00
[52] U.S. Cl. ......................................... 55/52; 55/199; 55/206; 55/207; 175/66; 210/801; 210/539
[58] Field of Search ..................... 55/52, 55, 189, 199, 55/206, 207; 175/66, 206, 218; 210/801, 539

[56] References Cited

U.S. PATENT DOCUMENTS

| | | | |
|---|---|---|---|
| 3,500,943 | 3/1970 | Bingman | 175/66 |
| 3,623,608 | 11/1971 | Waterman | 210/539 X |
| 3,774,702 | 11/1973 | Elenburg | 175/66 |
| 3,859,217 | 1/1975 | Holstead et al. | 210/801 X |
| 4,202,778 | 5/1980 | Middlebeck | 210/539 X |
| 4,272,258 | 6/1981 | Shifflett | 55/52 |
| 4,397,659 | 8/1983 | Gowan | 55/52 X |

FOREIGN PATENT DOCUMENTS 2602584 8/1976 Fed. Rep. of Germany ........ 175/66

*Primary Examiner*—Charles Hart
*Attorney, Agent, or Firm*—G. Turner Moller

[57] ABSTRACT

A mud degasser is located in the mud return line between a well being drilled and a shale shaker mounted on a mud tank in order to degas all of the mud leaving the well. A variety of mechanisms operate on the mud to remove entrained gas. A major separating technique is to deliver the mud axially into a rotating pump impeller which slings the mud radially against the walls of the separator vessel. Other operating mechanisms include vibration and/or the application of a vacuum.

15 Claims, 7 Drawing Figures

MUD DEGASSER

This invention relates to a method and apparatus for degassing drilling mud during the course of drilling a well.

When wells are drilled into the earth, it occasionally happens that a quantity of natural gas in a formation penetrated by the well bore becomes entrained in the drilling mud thereby reducing the density of the drilling mud and consequently reducing the hydrostatic pressure of the mud in the well bore. When the hydrostatic pressure decreases, gas from any gas bearing formation is more likely to flow into the well bore thereby further cutting the mud and further reducing its density and hydrostatic pressure If this process continues, the mud will become so light that the well blows out.

Consequently, mud degassing units have long been employed in the drilling of wells in areas containing high pressure gas formations that act to remove a great deal of the entrained gas from drilling mud. Commercially available mud degassers fall into a variety of types which operate on a variety of different principles. A typical degasser operates on a vacuum principle. The mud is delivered to a vacuum chamber and spread out in relatively thin sheets over a plurality of downwardly inclined plates or leaves. The idea is that when the mud is spread out, and the vacuum is applied to the chamber, the entrained gas comes out of the mud, is picked up by the vacuum pump and discharged from the vacuum chamber. This general type degasser has been in use in the oil field for many years and, at one time, was the standard of the industry.

Other types of mud degassers incorporate pumps which pump the gas saturated mud into separating vessels arranged, in some fashion, to separate the entrained gas from the liquid mud. One of the major defects of standard vacuum degassers and those which pump gas cut drilling mud is that they are arranged to remove mud from the mud tank, degas the mud and then return the mud to the mud tank. There is inevitably a certain amount of dilution which occurs since the degasser is not treating all of the mud passing through the mud system.

The ideal location to degas drilling mud is before it reaches the mud tank because all of the mud in the system can thereby be degassed and there is no dilution of degassed mud with gas satuated mud. The problem is that commerically available degassers operating on the principles they use are incapable of tolerating the drilled solids which are carried by the mud. One would appreciate that sand grains, bits of shale or limestone pieces are not readily tolerated by those degassers which use a pump to pump the mud into a separating mechanism. Likewise, a conventional vacuum degasser is rapidly filled up with drilled solids because of the small tolerances and gaps inherent in these mechanisms.

Another problem, of course, with conventional mud degassers is operating efficiency. An early version of this invention was tested by circulating four barrels per minute of mud therethrough. The mud originally weighed 15.1 pounds per gallon and was cut with liquid propane to 11.2 pounds per gallon simulating a blowout condition. This mixture was delivered to the degasser which delivered mud weighing between 15.0 and 15.1 pounds per gallon at the outlet, demonstrating that substantially all of the propane had been removed.

This invention comprises a mud degassing apparatus and technique incorporating a standpipe receiving mud from the mud return line connected to the well. The outlet from the standpipe is above the inlet and is located to prevent air entry into the degasser from the inlet end, thereby avoiding mixing air and gas removed from the mud. If desired, a vibrating mechanism may be employed inside the standpipe to vibrate the mud and thereby promote coalescence of gas particles.

The mud exits from the standpipe into a first separating vessel. The mud is discharged into a rapidly rotating pump impeller type mechanism which slings the mud against the peripheral wall of the separator vessel. The separator vessel provides an upwardly directed gas exhaust stack in which a fan or vacuum pump is located. An opening in the bottom of the vessel allows degassed mud to pass out of the separating vessel. In the separating vessel, a variety of operating principles act to separate entrained gas from the mud. Centrifugal forces act to remove some of the gas since the heavier mud is preferentially discharged from the rotating impeller mechanism. When the thrown mud impacts on the separator wall, with a compressing action, separation takes place. The application of a vacuum to the separating vessel also removes a large quantity of gas.

When the mud exits from the first separating vessel, it passes into a second separating vessel operating on substantially the same principles. Mud passes from the second separating vessel into a mud line connected to the inlet box of a shale shaker. The inlet box overflows into the shale shaker and is accordingly maintained at a full condition. The height of the inlet box of the shale shaker is sufficient to prevent air entry into the degasser from the outlet end thereof.

It is an object of this invention to provide an improved degassing apparatus and technique.

Another object of this invention is to provide a degassing technique and apparatus which can be positioned in the mud return line to degas all of the mud exiting from a well.

Other objects and advantages of this invention will become more fully apparent as this description proceeds, reference being made to the accompanying drawings and attached claims.

Figure 1:
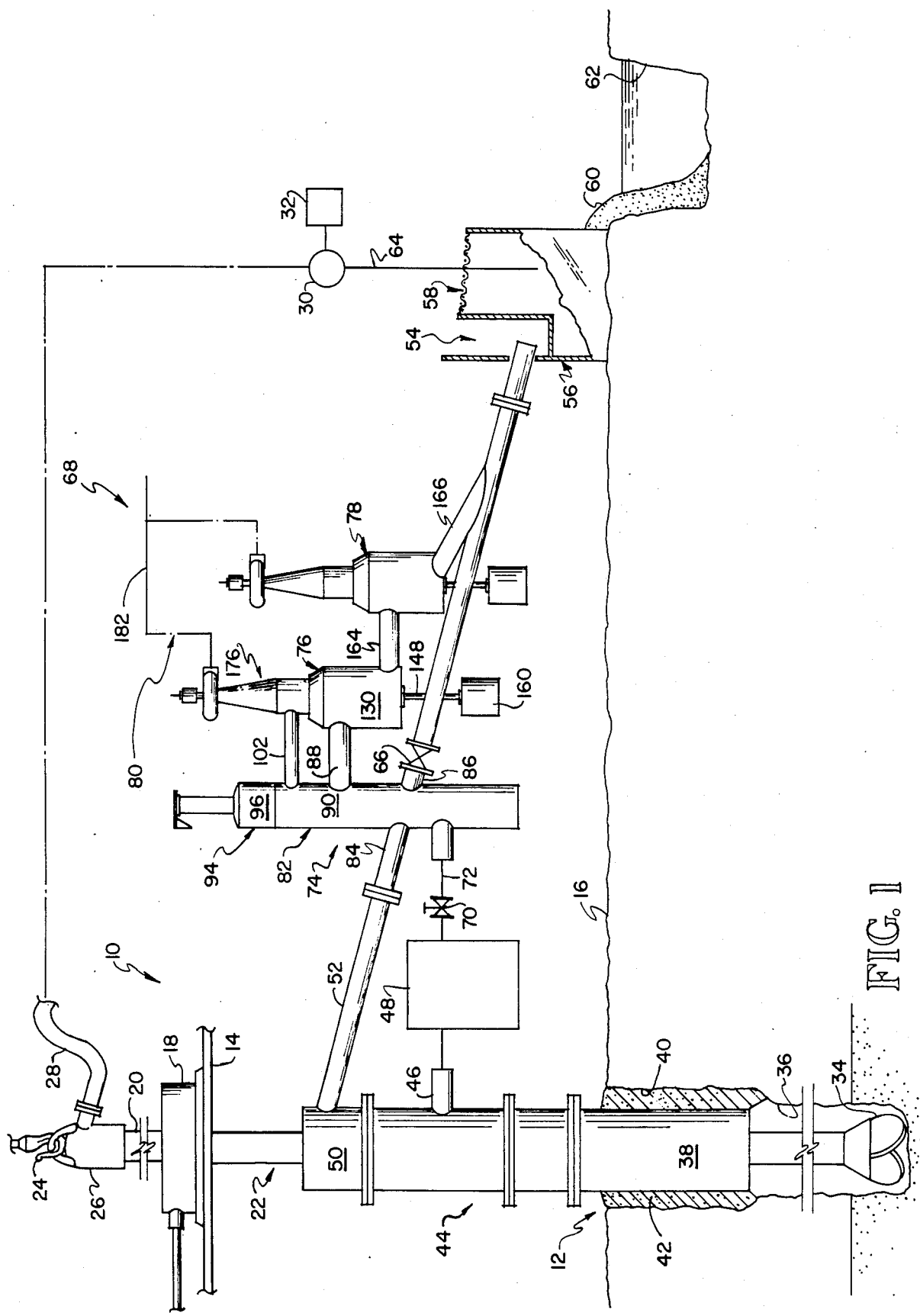
FIG. 1 is a flow diagram, partly schematic, of the degasser of this invention located between the well being drilled and a shale shaker-mud tank assembly.

Referring to FIG. 1, there is illustrated a drilling rig 10 in the process of drilling a well 12. The drilling rig 10 comprises a floor 14 supported above the ground 16 by a substructure (not shown), a rotary table 18 for turning a kelly 20 connected to a drill string 22 extending into the well 12, a hook 24 supporting a swivel 26 connected to the kelly 20 and, in turn, supported by a traveling block (not shown), and a mud hose 28 receiving mud from a pump 30 driven by a motor 32. A bit 34 is connected to the bottom of the drill string 22 and is in the process of drilling a bore hole 36 underneath a string of surface pipe 38 cemented in a surface hole 40 by a cement sheath 42. On top of the surface pipe 38 is a blowout preventer 44 having an outlet 46 connected to a choke manifold 48. In the normal course of drilling, mud circulated downwardly through the drill string 22 flows upwardly in the annulus between the drill string 22 and the bore hole 36 to exit from a standpipe 50 into a mud return line 52.

When drilling the surface hole 40 or when it is known that no gas kick is coming, the mud return line 52 connects directly to an inlet box 54 of a shale shaker 58 on a mud tank 56 arranged to receive overflow from the inlet box 54. Shale and large cuttings are discharged from the shaker 58 into a pile 60 in a shale pit 62. A conduit 64 leads from the mud tank 56 to the mud pump 30 thereby completing the mud circuit.

Those skilled in the art will recognize the drilling rig 10 as being typical of modern medium-to-deep drilling rigs.

When drilling in an area where entrained gas problems occur, a mud valve 66 is closed thereby diverting mud passing from the standpipe 50 through the degasser 68 of this invention. In the event the well is kicking, the blowout preventer 44 is closed to divert return mud through the BOP outlet 46 and through the choke manifold 48. A valve 70 in an outlet line 72 is opened to deliver gas cut mud into the degasser 68 of this invention.

The degasser 68 of this invention comprises, as major components, an inlet standpipe 74, a first separator 76, a second separator 78 and a gas handling system 80.

The standpipe 74 has several functions. First, it allows the removal of any free or easy to remove gas from the drilling mud. Second, it comprises a liquid trap preventing the entrance of air into the degasser 68. To these ends, the standpipe 74 comprises an upright vessel 82 having an inlet conduit stub 84 and a first outlet conduit 86. The conduits 84, 86 are connected, in any conventional manner, such as by the use of dresser coupling or the like, to become part of the mud return line 52. The conduits 84, 86 are aligned and are inclined to the horizontal providing a uniform slope or drop characteristic of the mud return line 52. Disposed substantially above the inlet conduit 84 is a second outlet conduit 88 from which mud overflows into the first separator 76.

The vessel 82 includes a lower stationary portion 90, an upper portion 92 and a hinge structure 94 pivotally connecting the upper portion 92 to the lower half 90. In this fashion, the overall height of the standpipe 74 can be reduced during transit.

The upper portion 92 comprises a section 96 which is conveniently of the same diameter as the lower half 90 and a standpipe 98 having a pivoted flapper valve 100 on the upper end thereof to allow the exit of pressurized gas from the vessel 82. In addition, the conduit 102 may be provided to connect the interior of the exhaust stack 98, as by the conduit 102 opening into the vessel 90 above the overflow conduit 88, to the gas handling system 80 so that any free or easy to remove gas can be immediately drawn off the standpipe 74 and disposed of without further difficulty.

Figure 3:
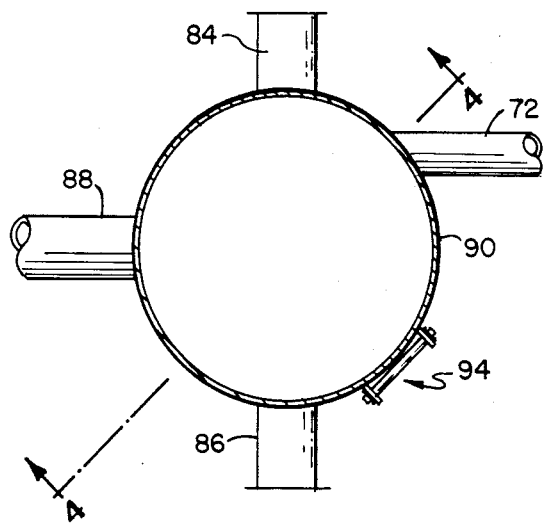
FIG. 3 is a top plan view of the standpipe of the degasser of FIGS. 1 and 2.
Figure 4:
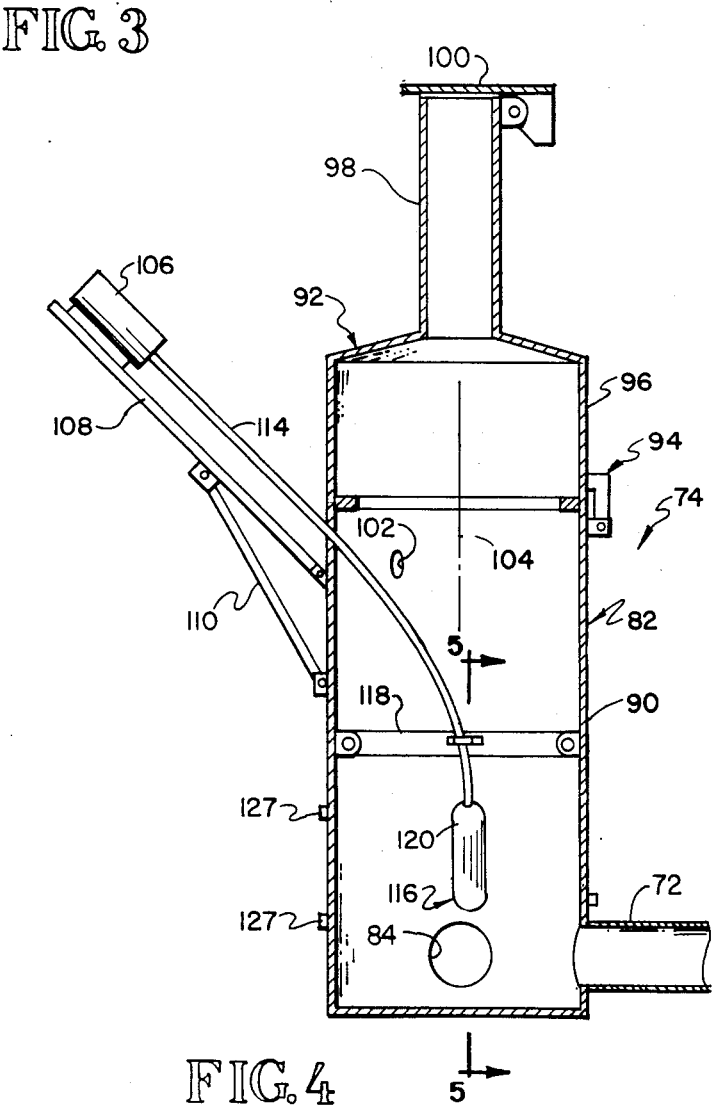
FIG. 4 is an enlarged vertical cross-sectional view of the standpipe of FIG. 3, taken substantially along line 4—4 thereof a viewed in the direction indicated by the arrows.
Figure 5:
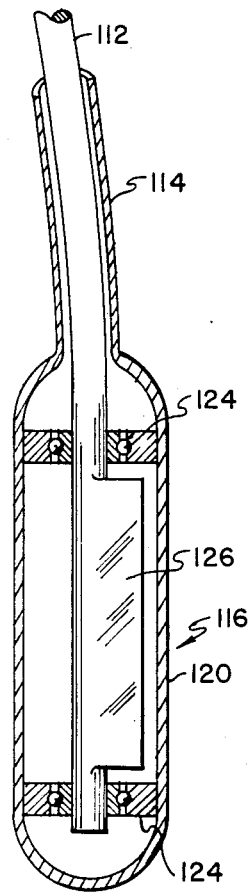
FIG. 5 is an enlarged cross-sectional view of the vibrating mechanism in the standpipe of FIG. 4, taken substantially along line 5—5 thereof as viewed in the direction indicated by the arrows.

As shown best in FIGS. 3-5, the standpipe 74 provides a desirable location for a vibrating mechanism 104. The vibrating mechanism 104 comprises a rotary electric motor 106 carried on a pivoted platform 108 supported by a pinned brace 110. The motor 106 includes a flexible drive output 112 located inside a flexible sheath 114 extending from the motor 106 to a vibrating head 116 located centrally inside the standpipe vessel 82 below the mud outlet 88.

The vibrating head 116 is supported inside the vessel 82 by a plurality of struts or braces 118. The vibrating head 116 includes a housing 120 having therein a pair of spaced bearing structures 124 rotatably receiving an eccentric weight 126 which is connected to the drive shaft 112.

In lieu of the vibrating mechanism 104 or in addition thereto a multiplicity of ultrasonic transducers 127 may be affixed to the exterior of the vessel 82 in order to apply ultrasonic vibrating energy to the mud contained therein.

Operation of the standpipe 74 should now be apparent. Mud enters the standpipe 74 either through the conduit stub 84 if drilling is progressing normally or through the choke manifold outlet line 72 in the event the blowout preventer is closed and returns are diverted through the choke manifold 48. In either event, mud enters the vessel 82 and is subjected to the vibrations of the vibrator 104. Any gas that comes out of the mud, either of its own accord, by gravity or because of the operation of the vibrator 104 moves upwardly inside the vessel 82. In the event the operating mechanisms of the gas handling system 80 are operating, the gas will be drawn off through the conduit 102. In the event the operating mechanisms of the gas handling system 80 are shut down, gas can escape from the standpipe 74 through the flapper valve 100.

Figure 2:
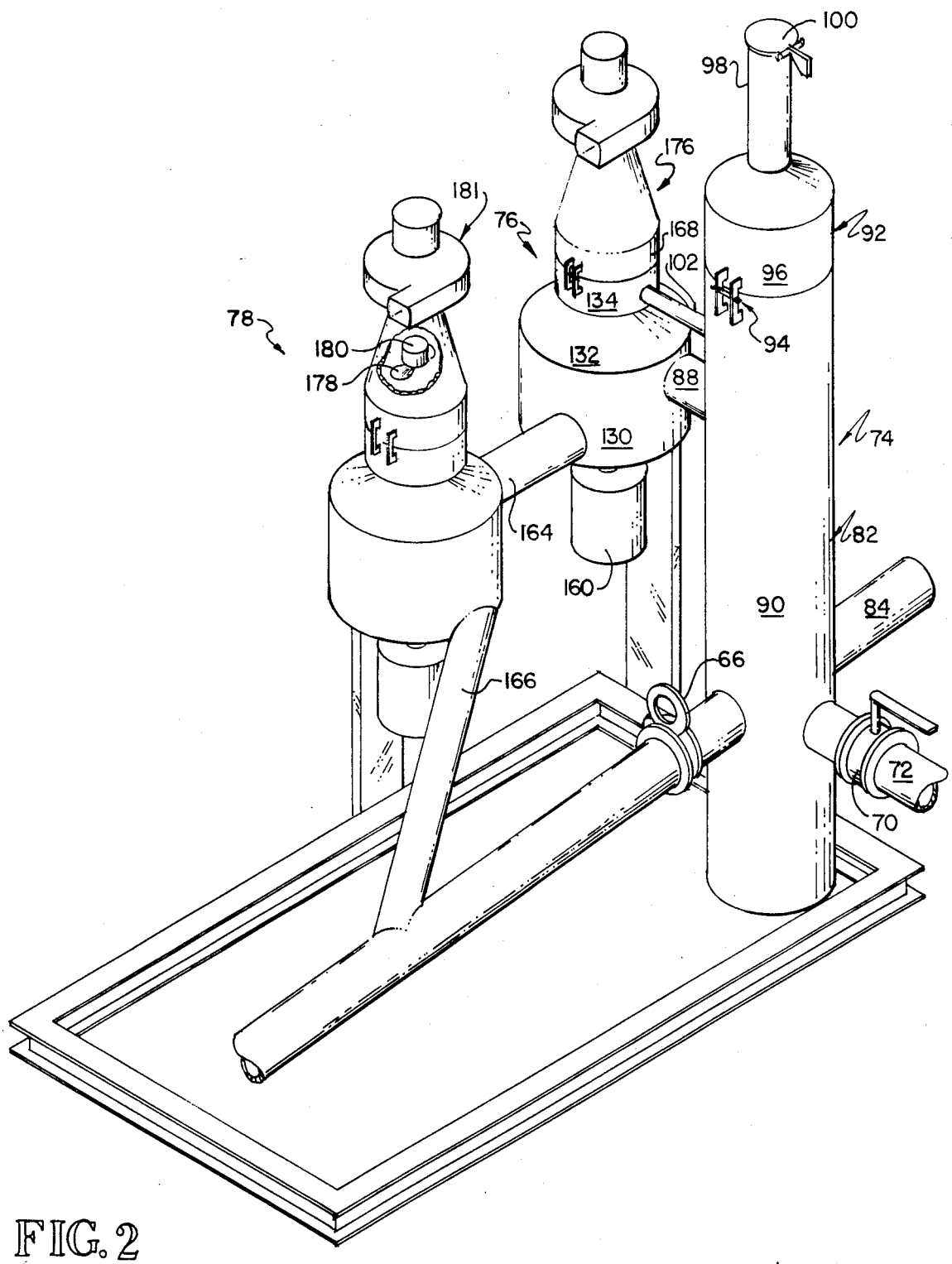
FIG. 2 is a side elevational view of the degasser of this invention.
Figure 6:
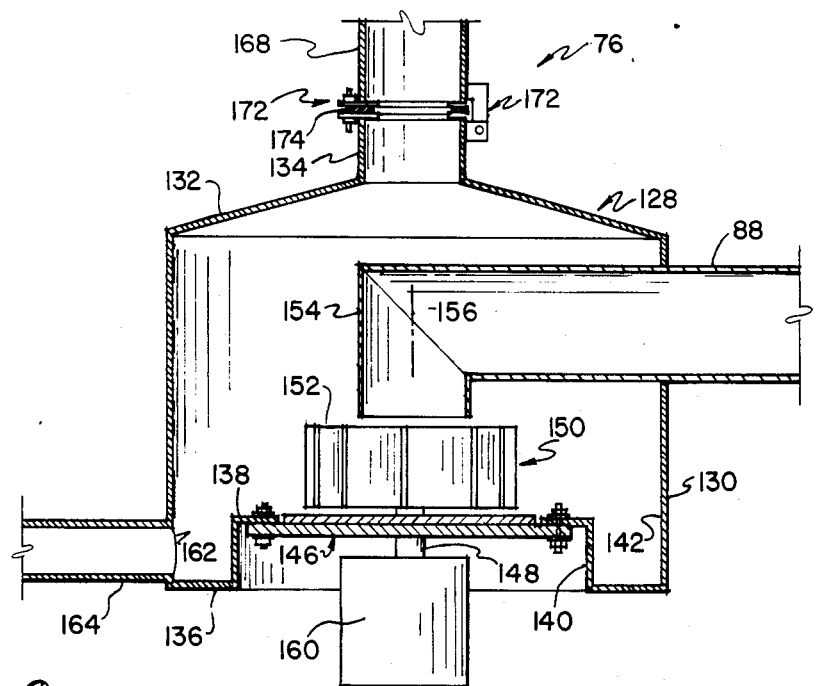
FIG. 6 is an enlarged cross-sectional view of the separator of the degassing unit of FIG. 2, taken substantially along line 6—6 thereof as viewed in the direction indicated by the arrows.

As shown best in FIGS. 2 and 6, the first and second separators 76, 78 are desirably identical and comprise a separator vessel 128 having a cylindrical wall 130 closed by a frusto-conical top 132 opening into a stack 134 comprising part of the gas handling system 80. The bottom of the vessel 128 comprises an annular bottom wall 136 and an elevated central platform 138 connected thereto by a cylindrical wall section 140 providing a sump 142 for receiving and carrying off degassed mud. Positioned on the central platform 138 is a removable wear plate assembly 146 having an opening therethrough receiving a drive shaft 148. Mounted on the end of the drive shaft 148 is a pump impeller 150 having a plurality of impeller blades 152 thereon.

The second outlet conduit 88 of the standpipe 74 passes through the wall of the separator vessel 128. An elbow 154 on the end thereof acts to divert mud passing through the outlet 88 downwardly directly onto the pump impeller 150. Conveniently, the elbow 154 and the impeller 150 are coaxial about an axis 156 comprising the axis of rotation of the shaft 148.

The shaft 148 is connected by a suitable coupling to an electric motor 160. When the motor 160 is energized and mud is diverted by the valve 66 into the degasser 68, mud overflows the standpipe 74 and passes through the outlet conduit 88 onto the rotating impeller 150. Gas cut mud is then discharged onto the interior cylindrical surface of the wall 130. Separation of the drilling mud from the entrained gas occurs. Several separating principles are in operation. First, some separation occurs because of the way centrifugal forces differentially act on materials of greater and lesser density. This manifestly tends to deliver the heavier mud to the cylindrical wall 130 and allows the lighter gas to escape upwardly through the stack 134. Second, some separation occurs because the mud and entrained gas impact in a compressing manner on the cylindrical wall 130. This creates a relatively thin film of gas cut mud on the inside of the cylindrical wall 130. As the mud runs down into the sump 142, the entrained gas is free to escape under the influence of the partial vacuum created by the gas handling system 80. Partially or wholly degassed mud accordingly exits from the first separator 76 through an opening 162.

Mud exiting from the opening 162 passes through a conduit 164 into the second separator 78 where the partially or wholly degassed mud is subjected to the same operating principles. The mud discharges from the second separator 78 into a conduit 166 opening into the mud return line 62. As will be evident from FIG. 1, the height of the inlet box 54 in the shaker 58 and the mud contained therein acts as a liquid trap to prevent air from entering the degasser 68 through the outlet end of the mud return line 52. It will accordingly be seen that there is little likelihood of air entering the degasser 68 thereby preventing the creation of a potentially dangerous mixture of oxygen and natural gas.

The gas handling system 80 of this invention comprises means for removing gas from the standpipe 74 and the first and second separators 76, 78. In addition, the gas handling system 80 desirably produces a vacuum in the vessels 82, 128 thereby promoting the separation of mud and entrained gas. To this end, the gas handling system 80 comprises means for drawing gas off of the top of the vessels 82, 128. On top of the stack 134 is a standpipe extension 168 pivotally connected thereto by a hinge mechanism 170 and hold-down 172. A resilient gasket 174 acts between the stack 134 and the extension 168 to prevent gas or air movement between the stack 134 and the extension 168. The extension 168 is desirably pivotally mounted relative to the stack 134 to reduce the height of the degasser 68 during transit. It will accordingly be seen that the stack 134 and extension 168 comprise a gas handling conduit 176.

Inside the conduit 176 is a power driven fan 178 powered by a motor 180 located inside the conduit 176. Conveniently, the motor 180 may be electrically or hydraulically driven. In addition, a vacuum pump 181 may be placed in the stacks 176.

If desired, the conduit 176 may open to the atmosphere or may connect to a flare line 182 extending away from the drilling rig 10, for example to a location on the other side of the shale pit 62. In this fashion, the removed gas may be delivered to a location remote from the rig 10 for safety reasons.

When drilling the surface hole 40 or at a time when no gas kick is anticipated, the mud valve 66 is opened so that mud overflowing the standpipe or bell nipple 50 into the mud flow line 52 bypasses the degasser 68 and flows directly into the inlet box 54 of the shaker 58.

When drilling in an area where a kick might reasonably be expected or when some gas appears entrained in the mud, the valve 66 is closed thereby diverting the mud in the inlet 84 through the degasser 68. As mud fills up inside the standpipe 74 to the overflow outlet 88, there is created a liquid trap preventing the entry of a substantial amount of air into the degasser 68. In the example being discussed, any free gas in the mud or gas which is readily removed is going to come out through the open top of the bell nipple 50 rather than off the gas port 90 of the standpipe 74. As the mud overflows the outlet 88 into the first separator 76, it passes downwardly in an axial direction onto the rotating impeller 150. The mud is then slung against the inside of the vessel wall 130 where a great deal of separation occurs. Gas is drawn off through the gas handling system 80 while the mud flows through the conduit 164 into the second separator 78. Inside the second separator 78, considerable separation occurs because of the same operating principles present in the first separator 76. It will be appreciated that the outlet of the second separator 78 is above the top of the inlet box 54 of the shaker 58 thereby creating a liquid trap preventing the entrance of substantial amounts of air into the degasser 68. The degassed mud enters the inlet box 54 and overflows onto the shell shaker 58 where large cuttings are removed in a conventional manner.

Operation of the degasser 68 is substantially the same when a kick is being taken. The driller manipulates the blowout preventer 44 to deliver returns through the outlet 46 through the choke manifold 48 and the open valve 70 into the degasser 68.

Quite satisfactory tests have been conducted with a prototype of this invention constructed along the lines disclosed herein. These tests were done on a fairly large drilling rig having the bell nipple 50 at an elevation sufficient to allow gravity flow into the standpipe 74, through the mud outlet 88 into the first separator 76, out of the conduit 164 into the second separator 78 and out of the outlet 166 back into the mud return line 52 and into the inlet box 54 of the shaker 58. Drilling rigs of this size are quite common in the oil field and are of the size where degassing units are commonly employed. In the event that it is desired to use a degasser of this invention on a rig having a lower floor 14 and consequently a lower bell nipple 50, modification of the degassing unit 68 is necessary to accommodate the shorter drop between the bell nipple 50 and the inlet to the shaker 58.

One technique for accomplishing this is to eliminate the second separator 78 and connect the outlet 164 of the first separator 76 directly to the inlet box 54 of the shale shaker 58.

Figure 7:
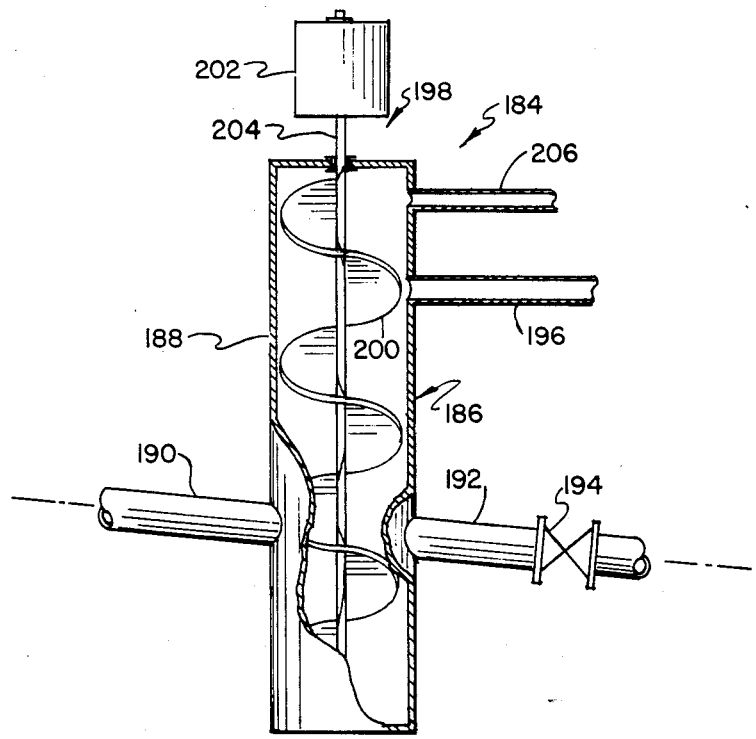
FIG. 7 is a side view, partly in section, of another embodiment of a standpipe for a degasser of this invention.

Another technique for modifying the degasser 68 for use on a smaller drilling rig is shown in FIG. 7 where the degassing unit 184 includes a standpipe 186 of somewhat different configuration. The standpipe 186 includes a vessel 188 having a mud inlet 190 and a first mud outlet 192. The outlets 190, 192 are connected, in any conventional manner, such as by the use of dresser couplings or the like, to become part of the mud return line. The conduits 190, 192 are aligned and are inclined to the horizontal providing a uniform slope or drop characteristic of the mud return line. In normal operation, with the degasser 184 out of operation, a mud valve 194 is open allowing direct circulation of mud between the conduits 190, 192.

Disposed substantially above the inlet conduit 190 is a second outlet conduit 196 at an elevation above the overflow outlet of the bell nipple of the rig with which the degasser 184 is associated. In order to elevate the mud in the standpipe 186 to a level allowing operation of the degasser 184, a lifting mechanism 198 is provided. The lifting mechanism 198 conveniently includes an auger 200 disposed inside the vessel 186, a motor 202 above the vessel 188 and a drive shaft 204 for rotating the augar 200. The gas outlet 206 at the top of the vessel 188 allows the removal of free or easy to remove gas without further difficulty. It will accordingly be seen that the modified standpipe of FIG. 7 allows a two separator type unit of this invention to be employed with relatively small drilling rigs.

Although the invention has been described in its preferred forms with a certain degree of particularity, it is understood that the present disclosure is only by way of example and that numerous changes in the details of construction and in the combination and arrangement of parts may be resorted to without departing from the spirit and scope of the invention as hereinafter claimed.

I claim:

1. In combination, a mud degasser for removing gases from a drilling mud and a mud tank having an inlet end including an inlet box having an overflow outlet for maintaining a predetermined height of drilling mud in the inlet box and an inlet opening below the predetermined height, the mud degasser including
   a mud inlet;
   a degassing unit comprising a vessel for separating the mud from the gases;
   a mud outlet in communication between the bottom of the vessel and the inlet opening to the inlet box; and
   means, including the inlet box and mud outlet, operating as a liquid trap for preventing air flow from the inlet box through the mud outlet into the degassing vessel.

2. The combination of claim 1 wherein the degassing unit comprises an impeller mounted in the vessel in mud receiving relation to the mud inlet and a motor for rotating the impeller and discharging the mud against the vessel.

3. The combination of claim 1 wherein the degassing unit comprises a standpipe having an inlet connected to the mud inlet and an outlet, the standpipe outlet being substantially higher than the standpipe inlet thereby creating a liquid trap preventing air entry into the vessel.

4. The process of degassing a drilling mud after it exits from a well being drilled, comprising
   elevating the mud to a first level and then gravitationally delivering the mud into a separator;
   separating gas from the mud in the separator and then gravitationally delivering the mud into an inlet of a shale shaker
   creating a liquid trap in the shale shaker inlet and then gravitationally delivering the mud from the inlet into the shale shaker.

5. The process of claim 4 wherein the mud exits from the well through a bell nipple having an overflow exit opening below the top thereof into a mud return line, the elevating step comprises elevating the mud inside a standpipe to the first level at an elevation below the exit opening of the bell nipple thereby creating a liquid trap in the standpipe.

6. A mud degassing system on a drilling rig of the type having a floor elevated above a blow out preventer and bell nipple, an inclined mud return line opening into the bell nipple at a first elevation for normally receiving returns from the well and a choke manifold connected to the blow out preventer for receiving returns from the well when the well is kicking and a mud tank, the system comprising
   a degassing unit
   a first inlet connected to the med return line below the first elevation, a second inlet connected to the choke manifold, and a first outlet connected to the mud tank and providing therebetween a downstream liquid seal;
   a first vessel, in communication with the first and second inlets, having
   a second outlet, above the first and second inlets and below the top of the first vessel, for overflowing liquid from the first vessel and providing an upstream liquid seal, and
   a third outlet, above the second outlet, for discharging gas from the first vessel;
   a second separating vessel, in communication with the second outlet for receiving liquid from the first vessel, having
   a solid member and means for centrifugally discharging gas cut mud thereagainst for separating mud from entrained gas, and
   a fourth outlet below the second outlet and in communication with the mud tank;
   means for drawing a vacuum on the third outlet of the first vessel and on the second separating vessel;
   the flow of mud through the degassing unit from the first inlet to the first outlet being by gravity.

7. The degassing system of claim 6 wherein the first vessel includes a fifth outlet, below the second and third outlets, in communication with the first outlet; a valve in the fifth outlet for allowing fluid flow directly from the first vessel to the first outlet and for diverting mud flow away from the first outlet toward the second and third outlets.

8. The degassing system of claim 6 wherein the second vessel includes a peripheral wall, a generally horizontal mud inlet conduit penetrating the wall having a downturned terminal end, an impeller mounted in the vessel below the terminal inlet conduit end, and a motor for rotating the impeller and discharging the mud against the solid member for separating entrained gas from the mud.

9. The degassing system of claim 8 wherein the second vessel includes a bottom wall having a flat portion, the impeller being mounted for rotation about a vertical axis above the flat bottom wall portion, the motor is mounted exteriorly of the vessel and includes a drive shaft extending through the flat bottom wall portion for rotating the impeller.

10. The degassing system of claim 9 wherein the second vessel includes an annular bottom wall portion, surrounding and residing below the flat bottom wall portion, for receiving mud discharged against the solid member.

11. The degassing system of claim 6 wherein the second vessel includes a stack for receiving the gases and the vacuum system comprises a motor and a fan in the stack for removing separated gases from the second vessel.

12. The degassing unit of claim 6 further comprising a third separating vessel, in communication with the fourth outlet, and having peripheral wall, a second mud inlet conduit penetrating the peripheral wall and terminating in a downturned end, a second impeller mounted in the third separating vessel in mud receiving relation to the second mud inlet and a second motor for rotating the second impeller and discharging the mud against the second vessel wall for separating entrained gas from the mud, a second stack for receiving the gases in communication with the vacuum system and a sixth outlet above the mud tank inlet box and below the fourth outlet.

13. A mud degassing system on a drilling rig of the type having a floor elevated above a blow out preventer and bell nipple, an inclined mud return line opening into the bell nipple at a first elevation for normally receiving returns from the well and a choke manifold connected to the blow out preventer for receiving returns from the well when the well is kicking and a mud tank, the system comprising a first inlet connected to the mud return line below the first elevation, a second inlet connected to the choke manifold, and a first outlet connected to the mud tank;

a first vessel, in communication with the first and second inlets, for receiving returns from the well and including a solid member and means for centrifugally discharging gas cut mud thereagainst for separating mud from entrained gas and having an outlet;

a second vessel, in communication with the outlet of the first vessel, including a solid member and means for centrifugally discharging gas cut mud thereagainst for separating mud from entrained gas and having an outlet in communication with the mud tank; and means for drawing a vacuum inside the first and second vessels;

the flow of mud through the degassing system from the bell nipple into the mud tank being by gravity.

14. The degassing system of claim 13 wherein the first and second vessels include a peripheral wall, a generally horizontal mud inlet conduit penetrating the well and having a downturned terminal end, an impeller mounted in the vessel below the terminal inlet conduit end, and a motor for rotating the impeller and discharging the mud against the peripheral wall for separating entrained gas from the mud.

15. The degassing system of claim 14 wherein the first and second vessels include an annular bottom wall portion, surrounding and residing below the flat bottom wall portion, for receiving mud discharged against the peripheral wall.

* * * * *